No. 865,607. PATENTED SEPT. 10, 1907.
J. P. OWINGS.
TEDDER ATTACHMENT FOR MOWING MACHINES.
APPLICATION FILED MAR. 12, 1907.
2 SHEETS—SHEET 1.
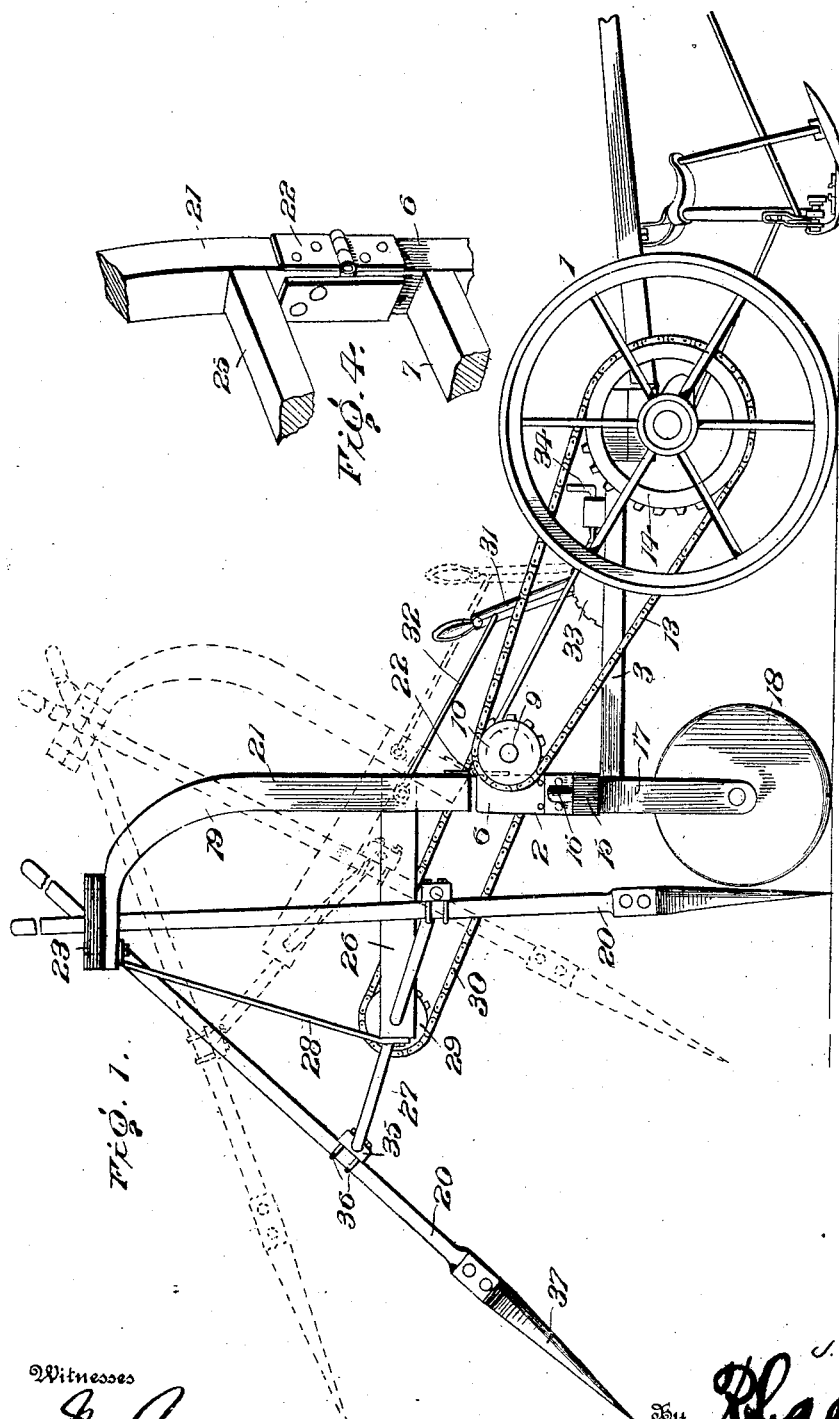
Inventor
J. P. Owings
Witnesses
Attorneys

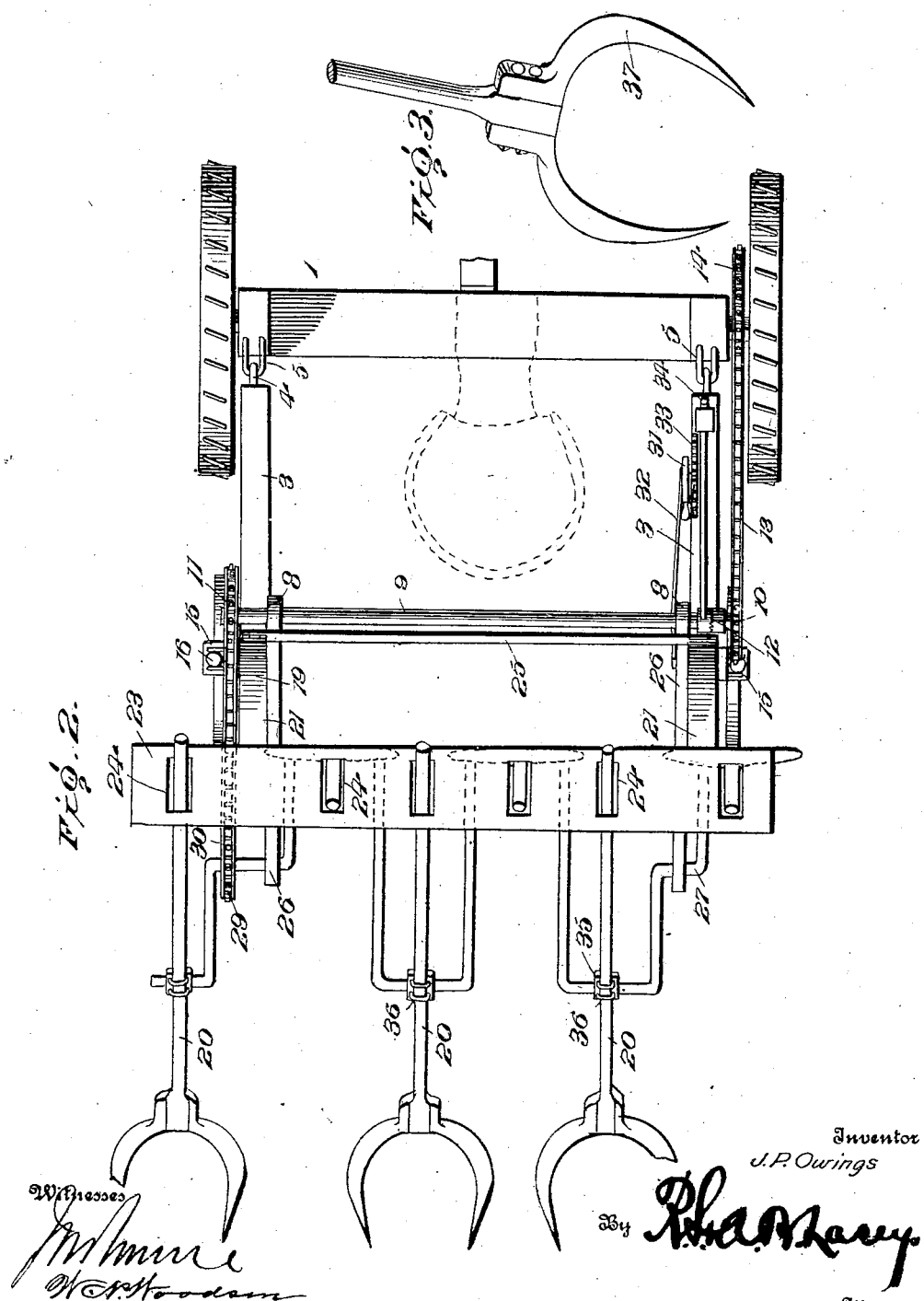

UNITED STATES PATENT OFFICE.

JAMES P. OWINGS, OF WEBSTER, KANSAS.

TEDDER ATTACHMENT FOR MOWING-MACHINES.

No. 865,607.  Specification of Letters Patent.  Patented Sept. 10, 1907.

Application filed March 12, 1907. Serial No. 361,999.

*To all whom it may concern:*

Be it known that I, JAMES P. OWINGS, a citizen of the United States, residing at Webster, in the county of Rooks and State of Kansas, have invented certain new and useful Improvements in Tedder Attachments for Mowing-Machines, of which the following is a specification.

The present invention relates to improvements in tedders of that type which are designed to be attached to a mowing machine for the purpose of thoroughly shaking up the hay immediately after cutting and thereby expediting the drying thereof.

The object of the invention has been to design a tedder of this type which can be readily attached to any conventional form of mowing machine and which is peculiarly designed so that the kickers or forks can be quickly swung into or out of operative position by a pivotal or rocking movement of the frame upon which they are mounted.

For a full description of the invention and the merits thereof and also to acquire a knowledge of the details of construction and the means for effecting the result, reference is to be had to the following description and accompanying drawings, in which:

Figure 1 is a side elevation showing the tedder attachment connected to the frame of a mowing machine, the position of the forks when swung into inoperative position being indicated by dotted lines. Fig. 2 is a top plan view of the device. Fig. 3 is a detail view of one of the forks. Fig. 4 is a detail view of the hinged joint between the supporting frame and the fork carrying frame.

Corresponding and like parts are referred to in the following description and indicated in all the views of the drawings by the same reference characters.

The invention is designed to be employed in connection with any conventional type of mowing machine such as that indicated at 1 upon the drawings. The supporting frame 2 of the attachment is provided with forwardly extending draft bars 3, the extremities of which carry hook members 4 which are detachably engaged by eyes 5 upon the frame of the mowing machine 1. In the specific construction of the supporting frame 2 it will be observed that the same comprises a pair of end upright members 6 connected by the transverse bars 7, the said uprights 6 carrying bearings 8 within which a shaft 9 is journaled. Sprocket wheels 10 and 11 are mounted upon the opposite ends of the shaft 9, the sprocket wheel 10 being designed to either rotate loosely upon the shaft or be locked rigidly therewith by means of a clutch member 12, and receiving motion through the medium of a chain or endless belt 13 from a sprocket wheel 14 secured to one of the supporting wheels of the mowing machine 1. Adjustably mounted upon each of the upright members 6 is a bearing block 15 within which is journaled the stem 16 projecting upwardly from a fork 17, the said fork having the caster wheel 18 mounted therein. It will thus be apparent that by vertically adjusting the bearing block 15 upon the upright members 6 the height of the supporting frame 2 can be adjusted to correspond to that of the mowing machine with which the attachment is being employed.

The fork carrying frame 19 is pivotally attached to the supporting frame 2 so as to have a swinging movement with respect thereto by means of which the kickers or forks 20 can be moved into or out of operative position. In the specific construction of the fork carrying frame 19 it will be observed that the same comprises two end standards 21 having their lower ends hinged to the upper extremities of the uprights 6 of the supporting frame 2 as indicated at 22, while their upper ends are bent rearwardly and support the guide bar 23 which is provided with the openings 24 through which the handles of the forks 20 extend. These standards 21 may be rigidly connected in any suitable manner such as by the transverse bars 25 and toward their lower ends are provided with the laterally extending brackets 26 carrying the bearings within which the compound crank shaft 27 is journaled. As shown in the drawings these brackets 26 are connected to the rearwardly extending portions of the standards 21 by means of the braces 28.

Rigid with the crank shaft 27 is a sprocket wheel 29 which receives motion from the before mentioned sprocket wheel 11 upon the shaft 9 through the medium of a chain or belt 30. It will thus be apparent that when the clutch member 12 is in such a position as to lock the sprocket 10 to the shaft 9 motion will be transmitted to the compound crank shaft 27 from one of the supporting wheels of the mowing machine and the forks will thereby be given the usual kicking motion.

In order to provide for the tilting of the fork carrying frame 19 for the purpose of raising the forks out of operative position, an operating lever 31 is employed which is mounted upon one of the draft bars 3 and is connected to one of the standards 21 of the fork carrying frame through the medium of a link member 32. This operating lever 31 carries any conventional form of latch which engages with the rack 33 to lock the lever in the required position. With this construction it will be readily apparent that when the lever is pushed forwardly the fork carrying frame is tilted in such a manner as to lift the forks out of operative position. A hand controlled mechanism 34 is also mounted upon one of the draft bars 3 for controlling the movements of the clutch 12 and is preferably located adjacent the operating lever 31 so that an attendant can control both the kickers and the clutch mechanism from a single position.

The fork handles are adjustably connected to the bearing blocks 35 engaging the crank portions of the shaft 27 by means of U bolts 36, and it will be readily apparent that the said forks can thus be adjusted to dig deeper or shallower as may be required. It may also be noted that the individual tines 37 of the forks 20 are detachably connected to the fork handle by any suitable means such as bolts and can therefore be readily replaced should they be accidentally bent or broken.

Having thus described the invention, what is claimed as new is:

1. In a device of the character described, the combination of a supporting frame comprising upright members, a fork carrying frame comprising standards having the lower portions thereof pivotally connected to the uprights, forks mounted upon the fork carrying frame, and means for tilting the fork carrying frame to move the forks into or out of operative position.

2. In a device of the character described, the combination of a supporting frame comprising a pair of uprights, a fork carrying frame comprising a pair of standards pivotally connected to the said uprights, a guide bar carried by the standards, brackets projecting from the standards, a crank shaft journaled in the brackets, forks mounted upon the crank shaft and engaging the guide bar, and means for transmitting motion to the crank shaft.

3. In a device of the character described, the combination of a supporting frame comprising uprights, a fork carrying frame comprising standards having their lower ends pivoted to the said uprights, while their upper ends are curved rearwardly, a guide bar carried by the rearwardly curved ends of the standards, brackets carried by the standards, a crank shaft journaled in the brackets, forks mounted upon the crank shaft and engaging the guide bar, and means for imparting motion to the crank shaft.

4. In a device of the character described, the combination of a supporting frame comprising a pair of uprights, a shaft journaled upon the uprights, means for transmitting motion to the shaft, a fork carrying frame comprising standards having their lower ends pivoted to the said uprights, brackets projecting from the standards, a crank shaft journaled in the brackets, forks mounted upon the crank shaft and engaging the guide bar, and means for transmitting motion from the first mentioned shaft to the crank shaft.

5. In a device of the character described, the combination of a supporting frame comprising uprights, draft bars whereby the supporting frame can be connected to a mowing machine or the like, a fork carrying frame having a hinged connection to the uprights of the supporting frame, forks mounted upon the fork carrying frame, and means for tilting the fork carrying frame to move the forks into or out of operative position.

In testimony whereof I affix my signature in presence of two witnesses.

JAMES P. OWINGS. [L. S.]

Witnesses:
C. E. JONES,
W. P. BRUIN.